(12) United States Patent
Teng et al.

(10) Patent No.: US 11,115,836 B1
(45) Date of Patent: Sep. 7, 2021

(54) SMART ANTENNA CONTROLLING METHOD AND SMART ANTENNA SYSTEM

(71) Applicants: Inventec (Pudong) Technology Corporation, Shanghai (CN); INVENTEC CORPORATION, Taipei (TW)

(72) Inventors: Pei-Ling Teng, Taipei (TW); Hsin-Hung Lin, Taipei (TW)

(73) Assignees: Inventec (Pudong) Technology Corporation, Shanghai (CN); INVENTEC CORPORATION, Taipei (TW)

(*) Notice: Subject to any disclaimer, the term of this patent is extended or adjusted under 35 U.S.C. 154(b) by 0 days.

(21) Appl. No.: 16/950,874

(22) Filed: Nov. 17, 2020

(30) Foreign Application Priority Data

Sep. 11, 2020 (CN) .......................... 202010953689.5

(51) Int. Cl.
| | | |
|---|---|---|
| *H04B 15/00* | (2006.01) | |
| *H04W 16/28* | (2009.01) | |
| *H01Q 3/24* | (2006.01) | |
| *H04B 7/06* | (2006.01) | |
| *H04B 17/336* | (2015.01) | |
| *H04B 17/318* | (2015.01) | |

(52) U.S. Cl.
CPC .............. *H04W 16/28* (2013.01); *H01Q 3/24* (2013.01); *H04B 7/061* (2013.01); *H04B 17/318* (2015.01); *H04B 17/336* (2015.01)

(58) Field of Classification Search
CPC ....... H04W 16/28; H01Q 3/24; H04B 17/318; H04B 7/061
See application file for complete search history.

(56) References Cited

U.S. PATENT DOCUMENTS

| | | | | |
|---|---|---|---|---|
| 7,525,493 B2 * | 4/2009 | Iwai | ...................... | H01Q 1/245 343/702 |
| 2015/0358979 A1* | 12/2015 | Puranik | ................ | H04B 1/3838 455/452.2 |

* cited by examiner

*Primary Examiner* — Nhan T Le
(74) *Attorney, Agent, or Firm* — CKC & Partners Co., LLC

(57) ABSTRACT

A smart antenna controlling method is used for controlling a smart antenna system, and the smart antenna system includes multiple antennas, a wireless network controller, and a processor. The smart antenna controlling method includes: receiving multiple wireless signals transmitted by a wireless access point, respectively, by using the antennas; providing multiple received signal strength indications (RSSIs) corresponding to the wireless signals received by the antennas to the processor, respectively, by using the wireless network controller; generating multiple control signals corresponding to the antennas according to the RSSIs, by using the processor; and switching radiation patterns of the antennas according to the control signals, respectively, such that the RSSIs of the wireless signals are the same, and not smaller than a threshold value.

8 Claims, 12 Drawing Sheets

100

US 11,115,836 B1

SMART ANTENNA CONTROLLING METHOD AND SMART ANTENNA SYSTEM

RELATED APPLICATION

The present application claims priority to China Application Serial Number 202010953689.5, filed Sep. 11, 2020, which is incorporated herein by reference in its entirety.

BACKGROUND

Technical Field

The present disclosure relates to a smart antenna controlling method and a smart antenna system. More particularly, the present disclosure relates to a smart antenna controlling method and a smart antenna system that can switch radiation patterns.

Description of Related Art

In the application of small portable products, such as laptops, mobile phones, tablets, etc., spatial diversity technology is often used in antennas to overcome unknowable signal propagation environment and interference. Spatial diversity requires at least two antennas and a certain isolation distance to achieve a far-field radiation pattern that is approximately omni-directional, so that the signals at any angle are not missed, and the network throughput is increased.

SUMMARY

One aspect of the present disclosure is to provide a smart antenna controlling method for controlling a smart antenna system, in which the smart antenna system includes a number of antennas, a wireless network controller, and a processor, and the method includes: respectively receiving, by the antennas, a number of wireless signals transmitted by a wireless access point; providing a number of received signal strength indications respectively corresponding to the wireless signals received by the antennas to the processor; generating, by the processor, a number of control signals corresponding to the antennas, respectively, according to the received signal strength indications; and switching radiation patterns of the antennas according to the control signals, respectively, such that the received signal strength indications of the wireless signals are substantially the same and not lower than a threshold value.

Some aspects of the present disclosure provide a smart antenna system including a number of antennas, a wireless network controller, a processor and a number of switching circuits. The antennas are configured to receive a number of wireless signals transmitted by a wireless access point, respectively. The wireless network controller is configured to provide a number of received signal strength indications respectively corresponding to the wireless signals according to the wireless signals received by the antennas. The processor is electrically coupled to the wireless network controller and the antennas, and configured to generate a number of control signals respectively corresponding to the antennas according to the received signal strength indications. The switching circuits, coupled to the processor and respectively coupled to the antennas, are configured to switch radiation patterns of the antennas according to the control signals, respectively, such that the received signal strength indications of the wireless signals are substantially the same and not lower than a threshold value.

One of advantages of the present disclosure is that the processor may adjust the radiation patterns of the antennas according to the received signal strength detected to overcome the problem of signal dead spot.

It is to be understood that both the foregoing general description and the following detailed description are by examples, and are intended to provide further explanation of the disclosure as claimed.

DETAILED DESCRIPTION

Figure 1:
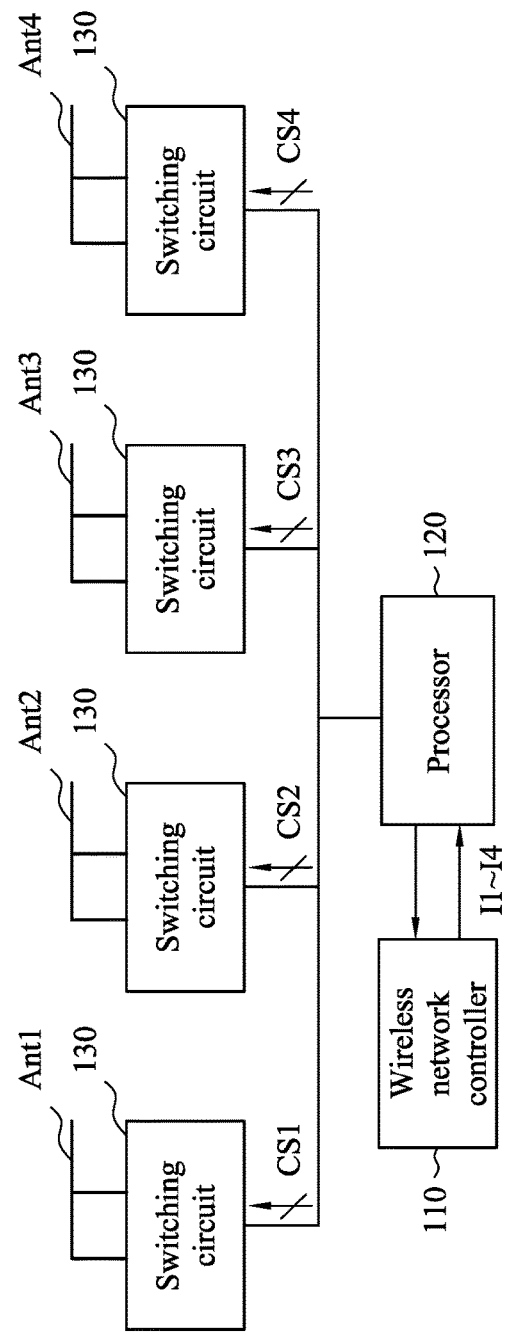
FIG. 1 is a schematic diagram of a smart antenna system, in accordance with an embodiment of the present disclosure.

The embodiments of the present disclosure will be described below in conjunction with related drawings. In the drawings, the same reference numerals indicate the same or similar elements or method process.

All the terms used in this document generally have their ordinary meanings. The examples of using any terms discussed herein such as those defined in commonly used dictionaries are illustrative only, and should not limit the scope and meaning of the disclosure. Likewise, the present disclosure is not limited to some embodiments given in this document.

FIG. 1 is a schematic diagram of a smart antenna system 100, in accordance with an embodiment of the present disclosure. As shown in FIG. 1, the smart antenna system 100 comprises a number of antennas Ant1-Ant4, a wireless network controller 110, a processor 120 and multiple switching circuits 130. The wireless network controller 110 is electrically coupled to the processor 120, and the antennas Ant1-Ant4 are respectively coupled to the processor 120 through a corresponding one of the switching circuits 130.

In some embodiments, the antennas Ant1-Ant4 are antennas having radiation patterns that can be switched, and the antennas Ant1-Ant4 are configured to respectively receive a number of wireless signals transmitted from a wireless access point AP (e.g., the access point AP shown in FIG. 5A later). The wireless network controller 110 provides received signal strength indications (RSSIs) I1-I4 to the processor 120 according to the quality and/or strength of the wireless signals received by the antennas Ant1-Ant4 mentioned above, in which the RSSIs I1-I4 are respectively corresponding to the wireless signals received by the antennas Ant1-Ant4.

In some embodiments, the RSSIs I1-I4 are positively correlated to network throughput and signal-to-noise ratio (S/N). For instance, if the RSSI I1 received by the antenna Ant1 is lower than a preset threshold value, the quality of the wireless signals that users receive from the antenna Ant1 are poor, such as having a bad network throughput or a bad signal-to-noise ratio, resulting in slower internet connection speed or unstable internet connection and so on.

Therefore, the present disclosure, by using the processor 120, generates multiple control signals CS1-CS4 that respectively corresponds to the antennas Ant1-Ant4 according to the RSSIs I1-I4 aforementioned. To achieve better communication, the switching circuits 130 then switch the radiation patterns of the antennas Ant1-Ant4 according to the control signals CS1-CS4, respectively, such that the RSSIs I1-I4 of the wireless signals received by the antennas Ant1-Ant4 are substantially the same and not lower than a threshold value.

Figure 2:
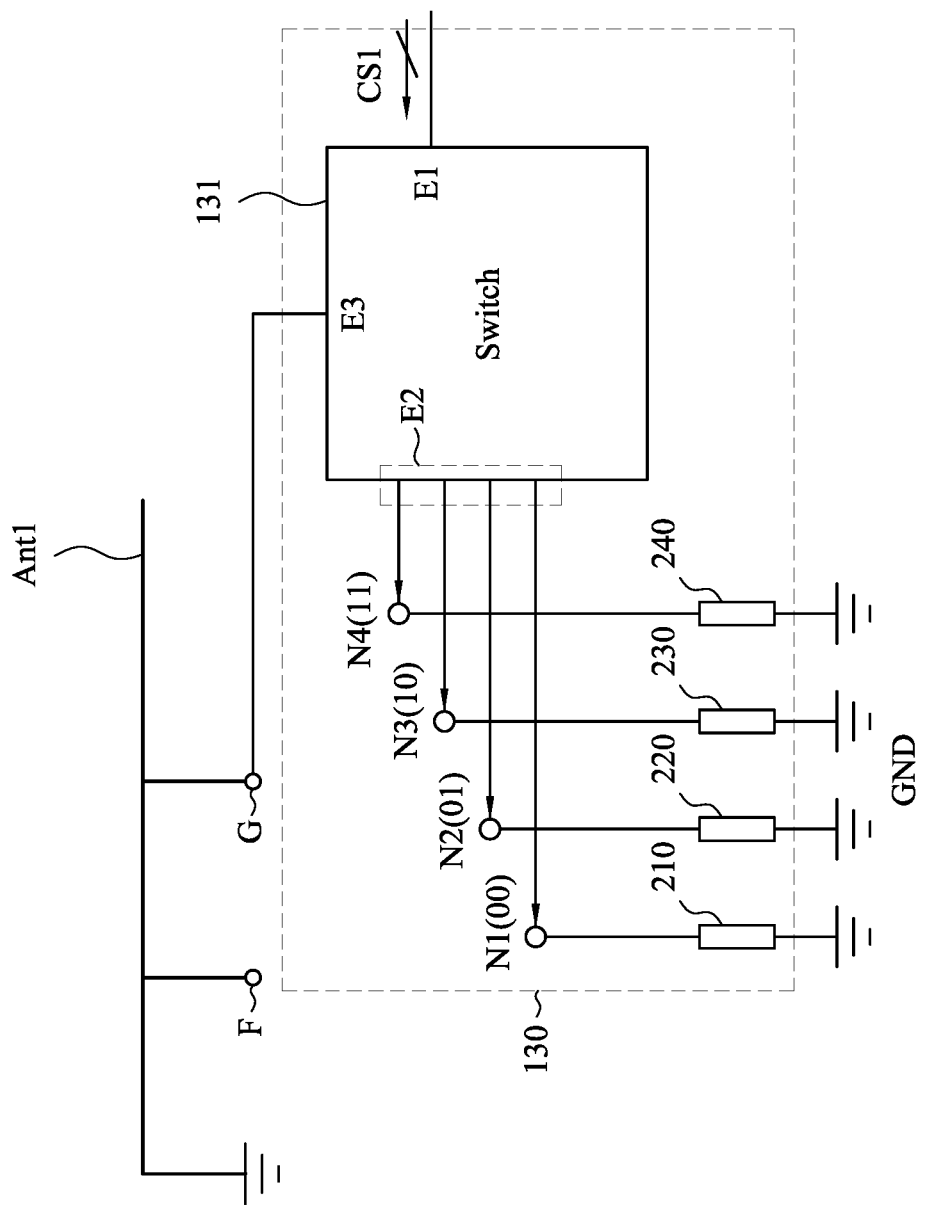
FIG. 2 is a schematic diagram of switching circuits, in accordance with an embodiment of the present disclosure.

FIG. 2 is a schematic diagram of switching circuits 130, in accordance with an embodiment of the present disclosure. Each of the switching circuits 130 comprises a switch 131 and a number of impedance circuits 210-240, in which impedance values of the impedance circuits 210-240 are different form each other. The switch 131 comprises a first terminal E1, a second terminal E2 and a third terminal E3. The first terminal E1 of the switch 131 is coupled to the processor 120 to receive a corresponding one of the control signals CS1-CS4 (e.g., control signal CS1). The second terminal E2 of the switch 131 is coupled to a coupling point G of a corresponding one of the antennas Ant1-Ant4 (e.g., antenna Ant1). The third terminal E3 of the switch 131 is coupled to multiple connection points N1-N4. The impedance circuits 210-240 are respectively coupled between the connection points N1-N4 and a ground terminal GND.

In operation, the switching circuit 130 selectively conducts one of the impedance circuits 210-240 to the coupling point G of the antenna Ant1 according to the control signal CS1, such that the antenna Ant1 generates multiple different radiation patterns. The aforementioned operation regarding to the antenna Ant1 is also applicable to the antennas Ant2-Ant4, such that each of the antennas Ant2-Ant4 can also generates multiple different radiation patterns. For the sake of brevity, those descriptions will not be repeated here.

In some embodiments, each of the antennas Ant1-Ant4 may be designed as an inverted-F antenna, and the input impedance may be adjusted by adjusting a distance between a feed point F on each of the antennas Ant1-Ant4 and the ground terminal GND.

In some embodiments, the switch 131 may be implemented by a radio frequency switch or a phase controller.

In some embodiments, the impedance circuits 210-240 may be implemented by different circuit components, respectively, such as resistors, inductors, capacitors or combinations of one or more from the above.

In some embodiments, the switching circuits 130 may be coupled to the processor 120 through a general-purpose input/output (GPIO) or a mobile industry processor interface (MIPI).

In some embodiments, the processor 120 may be implemented by a microcontroller (MCU), an application specification integrated circuit (ASIC), field programmable gate arrays (FPGA) or a central processing unit (CPU).

Figure 3:
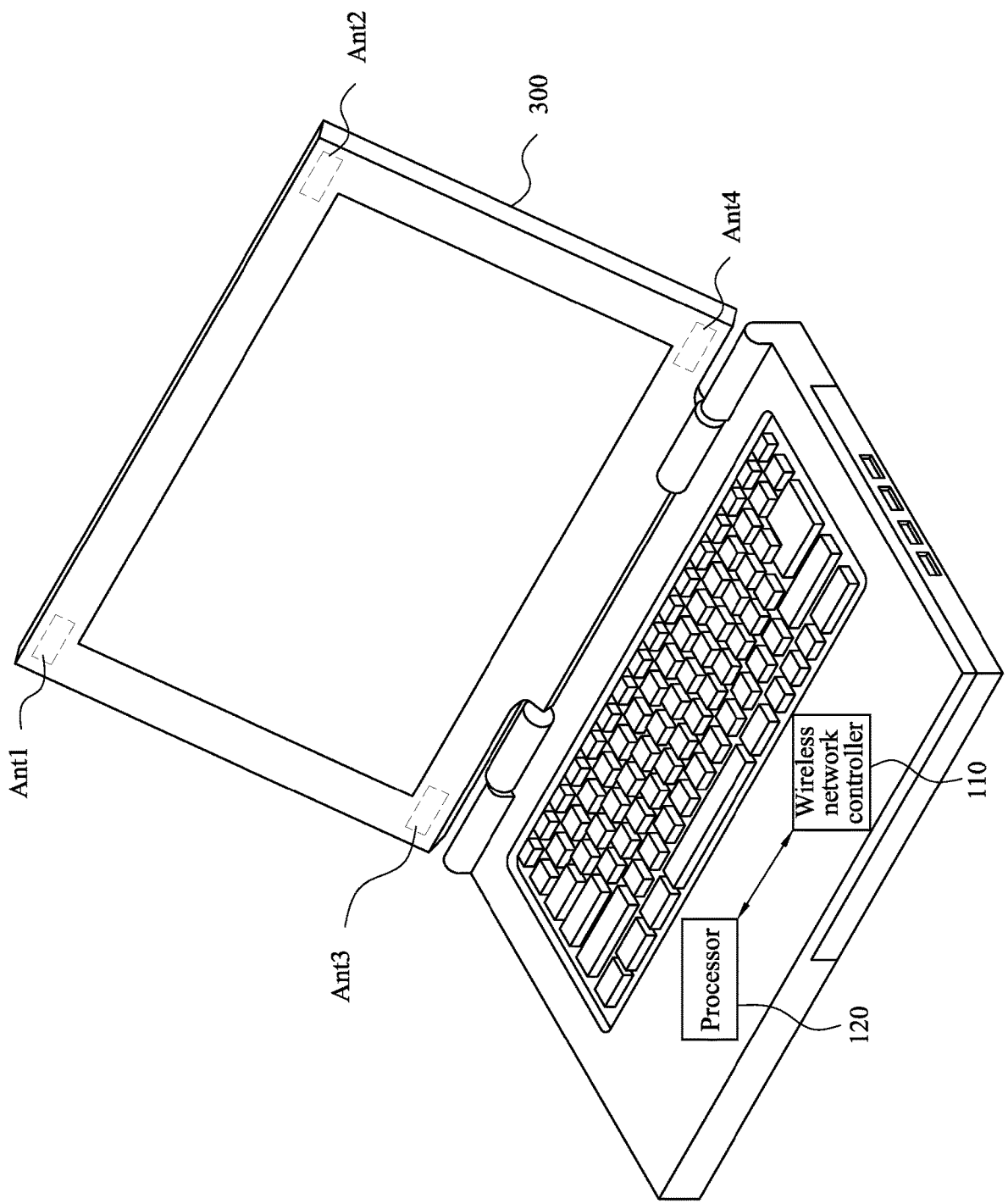
FIG. 3 is a schematic diagram of the smart antenna system installed in a mobile device, in accordance with an embodiment of the present disclosure.

FIG. 3 is a schematic diagram of the smart antenna system 100 installed in a mobile device 300, in accordance with an embodiment of the present disclosure. As shown in FIG. 3, the smart antenna system 100 may be installed in the mobile device 300 such as a laptop. In some embodiments, the wireless network controller 110 and the processor 120 may be placed in a base frame of the laptop, and the antennas Ant1-Ant4 may be placed in a bezel of a laptop display.

Figure 4:
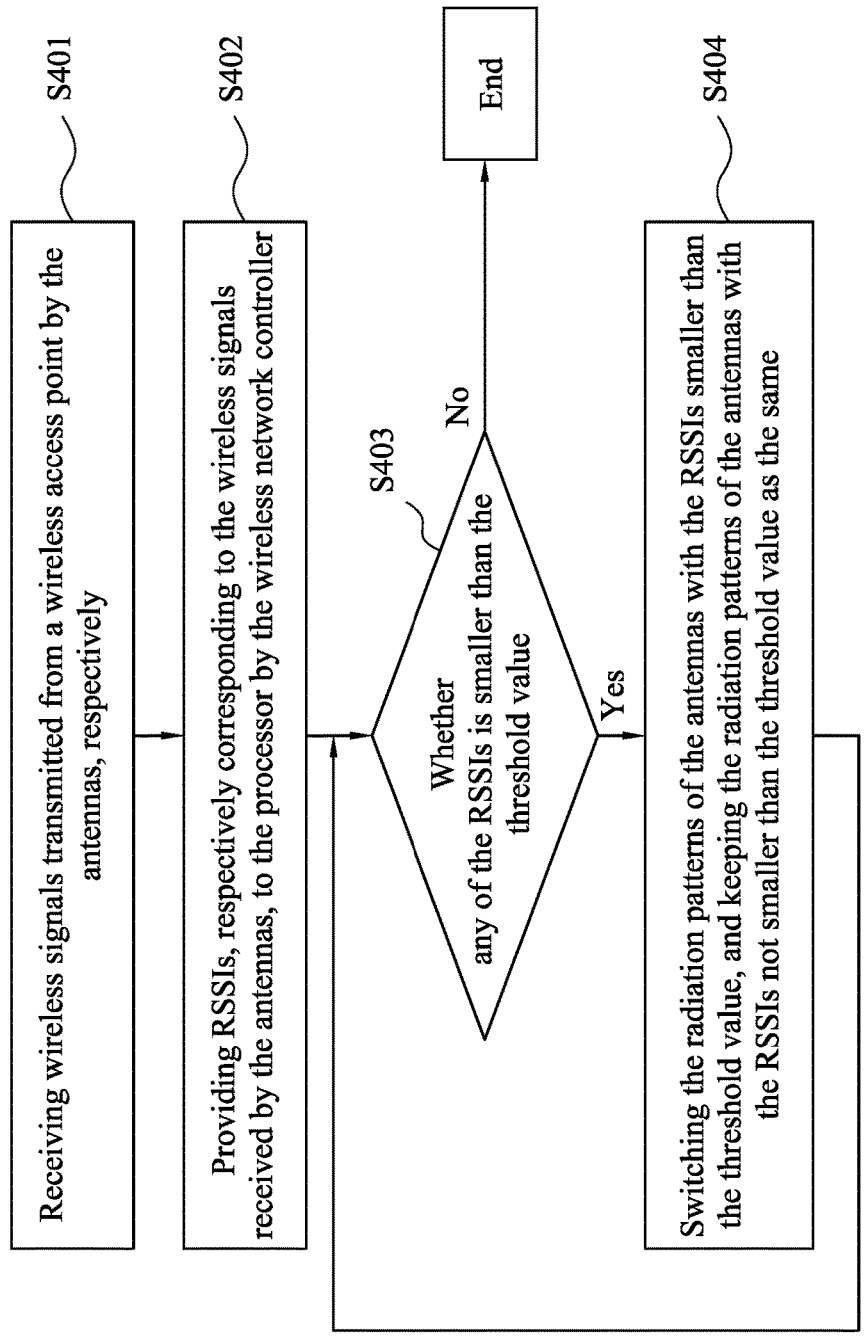
FIG. 4 is a flowchart of a method 400 of controlling smart antenna, in accordance with some embodiments of the present disclosure.

FIG. 4 is a flowchart of a method 400 of controlling smart antenna, in accordance with some embodiments of the present disclosure. FIG. 5A is a top view diagram of initial radiation patterns of the smart antenna system 100, in accordance with an embodiment of the present disclosure. FIG. 5B is a stereo diagram of the initial radiation patterns, in accordance with the embodiment of FIG. 5A. FIG. 6A is a top view diagram of switched radiation patterns of the smart antenna system 100, in accordance with an embodiment of the present disclosure. FIG. 6B is a stereo diagram of the switched radiation patterns, in accordance with the embodiment of FIG. 6A. The method 400 of controlling smart antenna is applicable to the smart antenna system 100. For the ease of illustration, the method 400 of controlling smart antenna in FIG. 4 will be described in conjunction with FIGS. 5A-5B and FIGS. 6A-6B.

In step S401, the mobile device 300 uses the antennas Ant1-Ant4 to receive the wireless signals transmitted from the wireless access point AP, respectively. The antennas Ant1-Ant4 have preset radiation patterns R1a-R4a, respectively. For instance, in the embodiment of FIGS. 5A-5B, when looking down (i.e., looking along −z direction) on the mobile device 300, the antenna Ant1 and antenna Ant3 have radiation patterns R1a and R3a directed to a first direction (i.e., −y direction), respectively. The antenna Ant2 and antenna Ant4 have radiation patterns R2a and R4a directed to a direction (i.e., +y direction) that is opposite to the first direction, respectively. The wireless access point AP placed in the first direction (i.e., −y direction) of the mobile device 300.

In step S402, the RSSIs I1-I4, respectively corresponding to the wireless signals received by the antennas Ant1-Ant4, are provided to the processor 120 by the wireless network controller 110.

Figure 5A:
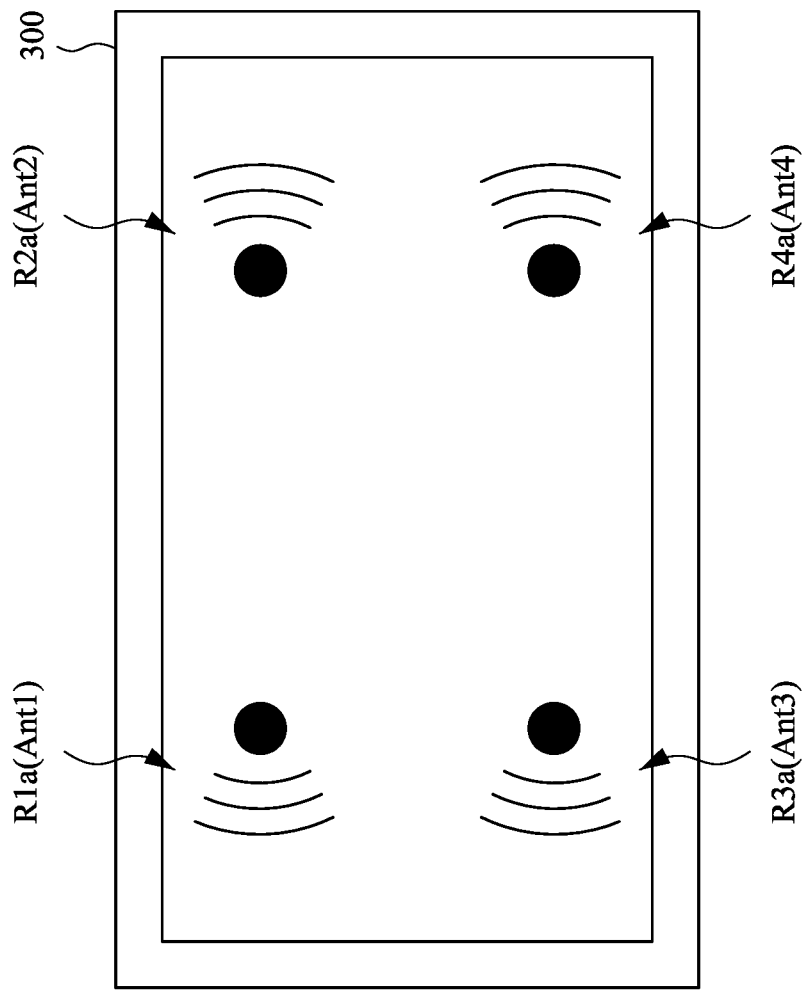
FIG. 5A is a top view diagram of initial radiation patterns of the smart antenna system 100, in accordance with an embodiment of the present disclosure.
Figure 5B:
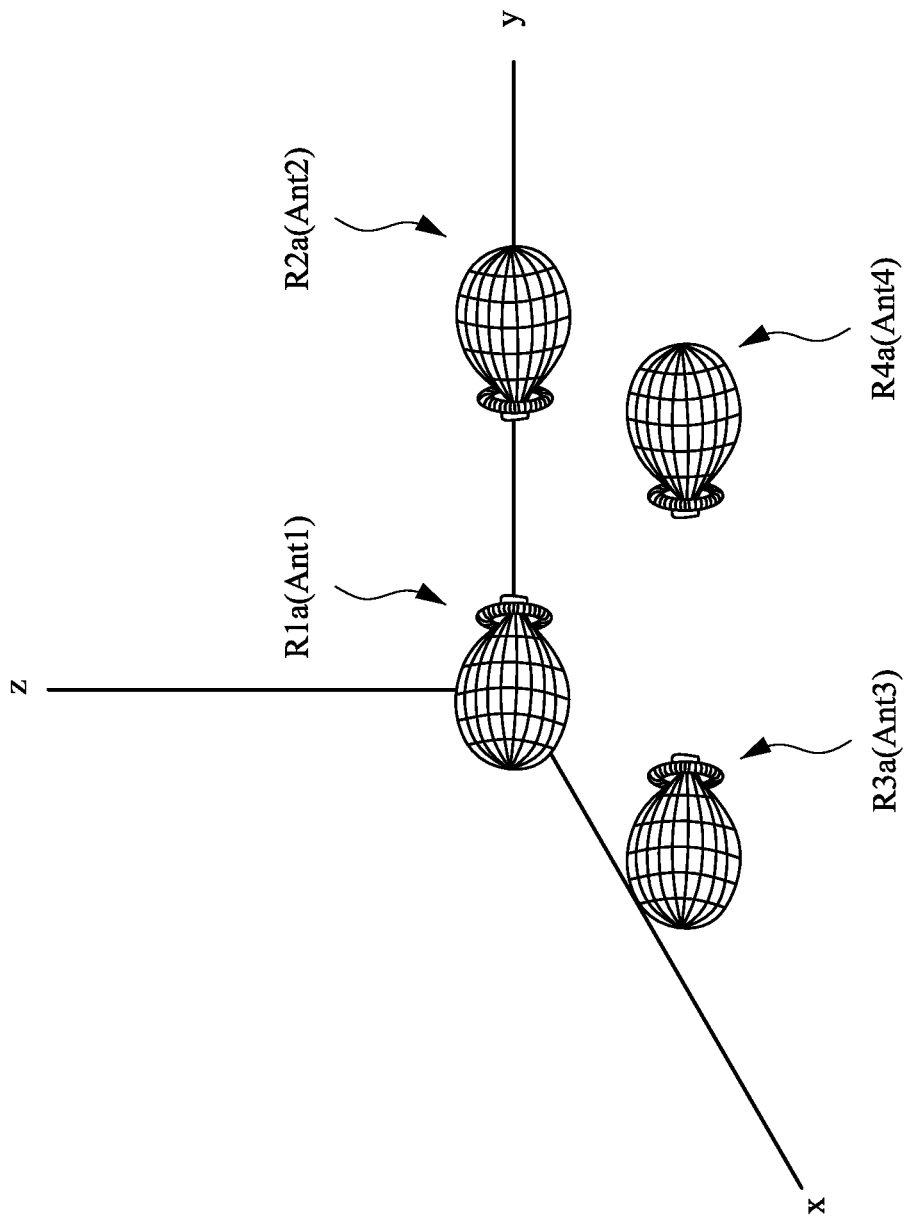
FIG. 5B is a stereo diagram of the initial radiation patterns, in accordance with the embodiment of FIG. 5A.
Figure 6A:
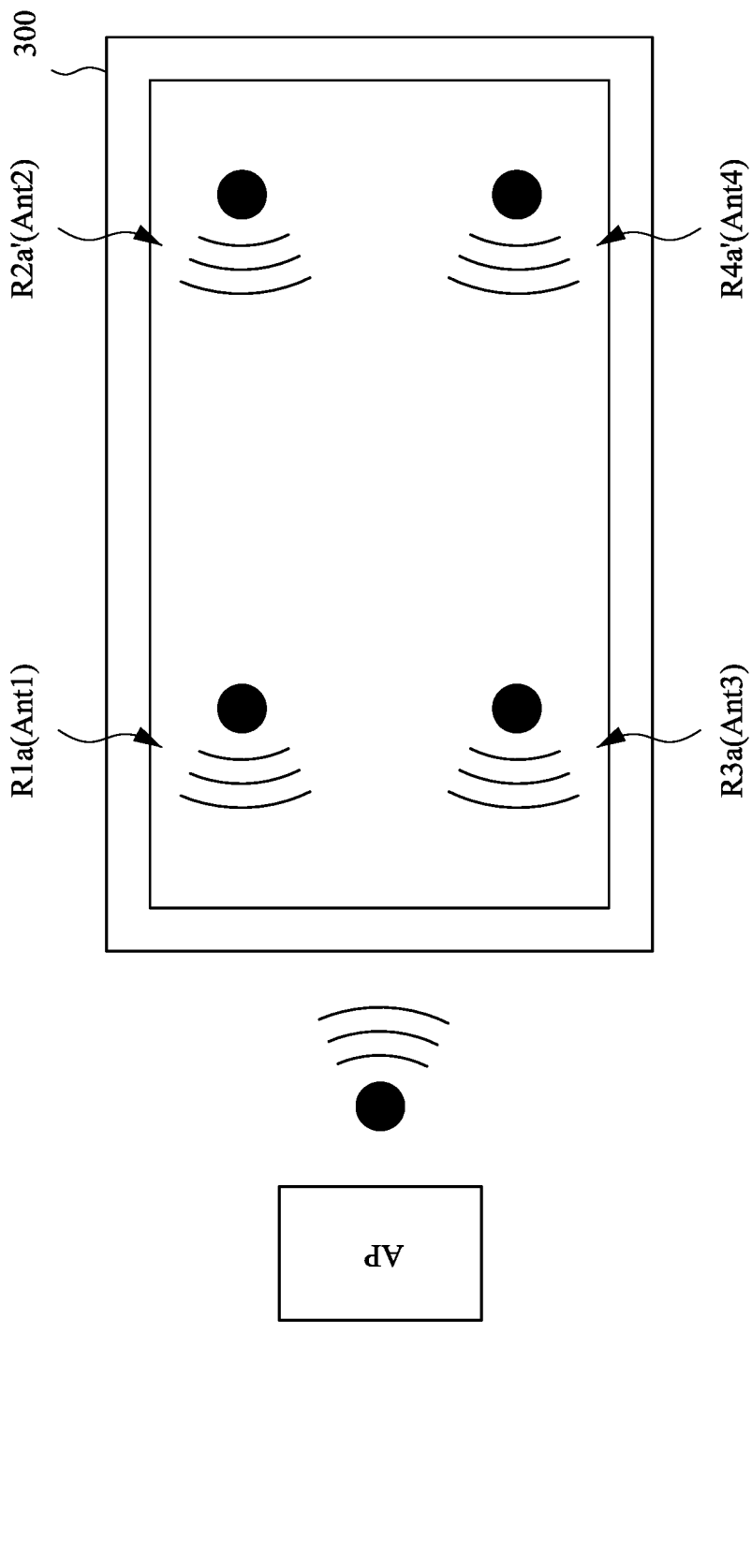
FIG. 6A is a top view diagram of switched radiation patterns of the smart antenna system 100, in accordance with an embodiment of the present disclosure.
Figure 6B:
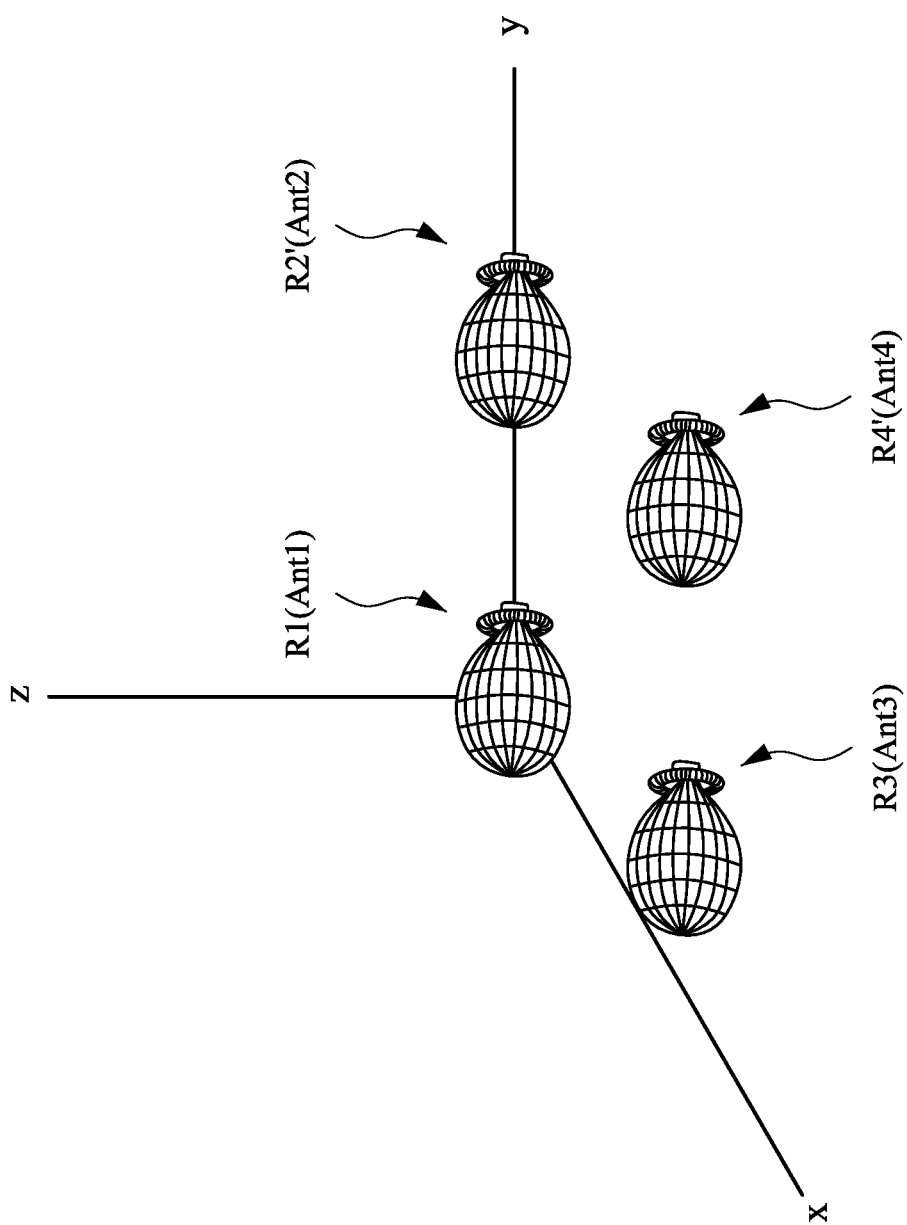
FIG. 6B is a stereo diagram of the switched radiation patterns, in accordance with the embodiment of FIG. 6A.

For instance, in the embodiment of FIGS. 5A-5B, the radiation patterns R1a and R3a of the antenna Ant1 and the antenna Ant3 are directed to the location of the wireless access point AP, and thus the wireless network controller 110 determines that the antenna Ant1 and antenna Ant3 receive strong wireless signals. Therefore, the wireless network controller 110 transmits the RSSIs I1 and I3 of the antenna Ant1 and the antenna Ant3 that represent good signal quality to the processor 120. On the other hand, the radiation patterns R2a and R4a of the antenna Ant2 and the antenna Ant4 are directed opposite to the location of the wireless access point AP, and thus the wireless network controller 110 determines that the antenna Ant2 and antenna Ant4 receive weak wireless signals. Therefore, the wireless network controller 110 transmits the RSSIs I2 and I4 of the antenna Ant2 and the antenna Ant4 that represent bad signal quality to the processor 120.

In step S403, the processor 120 determines that if one or more of the RSSIs I1-I4 are smaller than the threshold value. If so, the processor 120 proceeds to operate step S404 to switch the radiation patterns of corresponding one or more of the antennas Ant1-Ant4, such that the RSSIs I1-I4 are substantially the same and not lower than the threshold value aforementioned. If not, the processor 120 keeps the current radiation patterns of the antennas Ant1-Ant4 and terminates the method 400 of controlling smart antenna.

For instance, in the embodiment of FIGS. 5A-5B, in step S403, the processor 120 determines that the RSSIs I2 and I4 are smaller than the threshold value, and thus the processor 120 generates the control signals CS2 and CS4 with corresponding numerical values in step S404 to switch the radiation patterns R2$a$ and R4$a$ of the antennas Ant2 and Ant4 in FIGS. 5A-5B to the radiation patterns R2$a$' and R4$a$' as shown in FIGS. 6A-6B. On the other hand, the processor 120 determines that the RSSIs I1 and I3 are not smaller than the threshold value, and thus the processor 120 keeps the radiation patterns R1$a$ and R3$a$ of the antennas Ant1 and Ant3 as the same by using the control signals CS1 and CS3, i.e., the radiation patterns R1$a$ and R3$a$ in FIGS. 5A-5B remain the same in FIGS. 6A-6B.

In detail, reference is now made to FIG. 1 and FIG. 2 again, each of the control signals CS1-CS4 may be a multi-bit signal with a preset numerical value (e.g., 0). Take FIG. 2 as an example, the control signal CS1 may be a 2 bits signal with a preset numerical value 0 (expressed as 00 in binary), and thus the switch 131 conducts the coupling point G of the antenna Ant1 to the impedance circuit 210 by default, such that the antenna Ant1 has a preset radiation pattern R1$a$.

In some embodiments, if the processor 120 determines that the RSSI I1 is not smaller than the threshold value in step S403, the numerical value of the control signal CS1 is remained 0 by the processor 120 in step S404. Therefore, the coupling point G and the impedance circuit 210 remain conducted by the switch 131.

In some other embodiments, if the processor 120 determines that the RSSI is smaller than the threshold value in step S403, the processor 120 switch the numerical value of the control signal CS1 in step S404 such that the conductive path of the coupling point G is switched by the switch 131. For instance, the processor 120 may switch the numerical value of the control signal CS1 from 0 to 1 (expressed as 01 in binary) in step S404, then the coupling point G and the impedance circuit 220 is conducted by the switch 131. In such way, the antenna Ant1 will switch to a new radiation pattern from the preset radiation pattern R1$a$. The operation of switching the radiation patterns of the antenna Ant1 through the control signal CS1 mentioned above also applies to the antennas Ant2-Ant4 and the control signals CS2-CS4. For the sake of brevity, those descriptions will not be repeated here.

In some embodiments, the smart antenna system 100 may execute step S403 and S404 multiple times, in order to switch the radiation patterns of corresponding one or more of the antennas Ant1-Ant4 multiple times until the RSSIs I1-I4 are substantially the same and not lower than the threshold value.

Figure 7A:
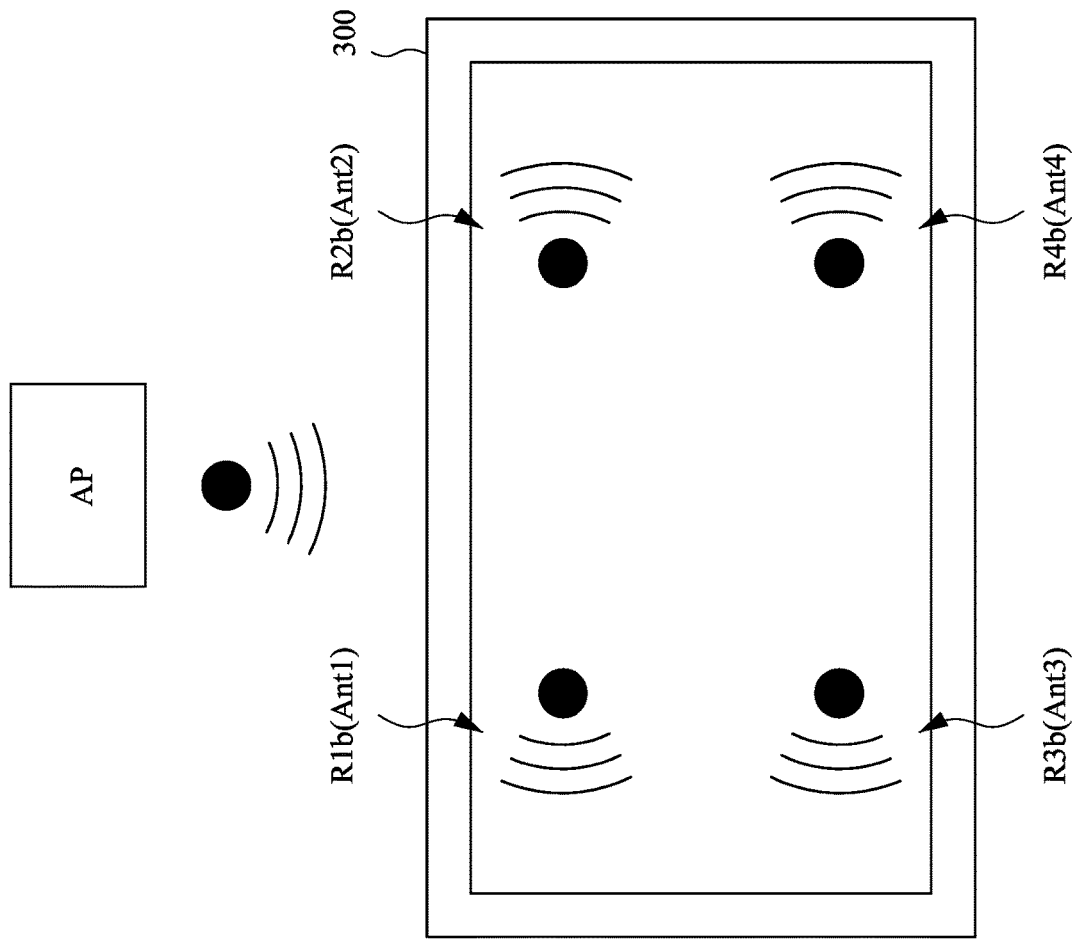
FIG. 7A is a top view diagram of initial radiation patterns of the smart antenna system, in accordance with another embodiment of the present disclosure.
Figure 7A:
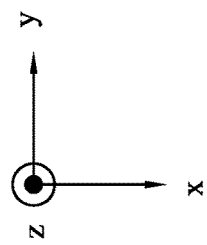
Figure 7B:
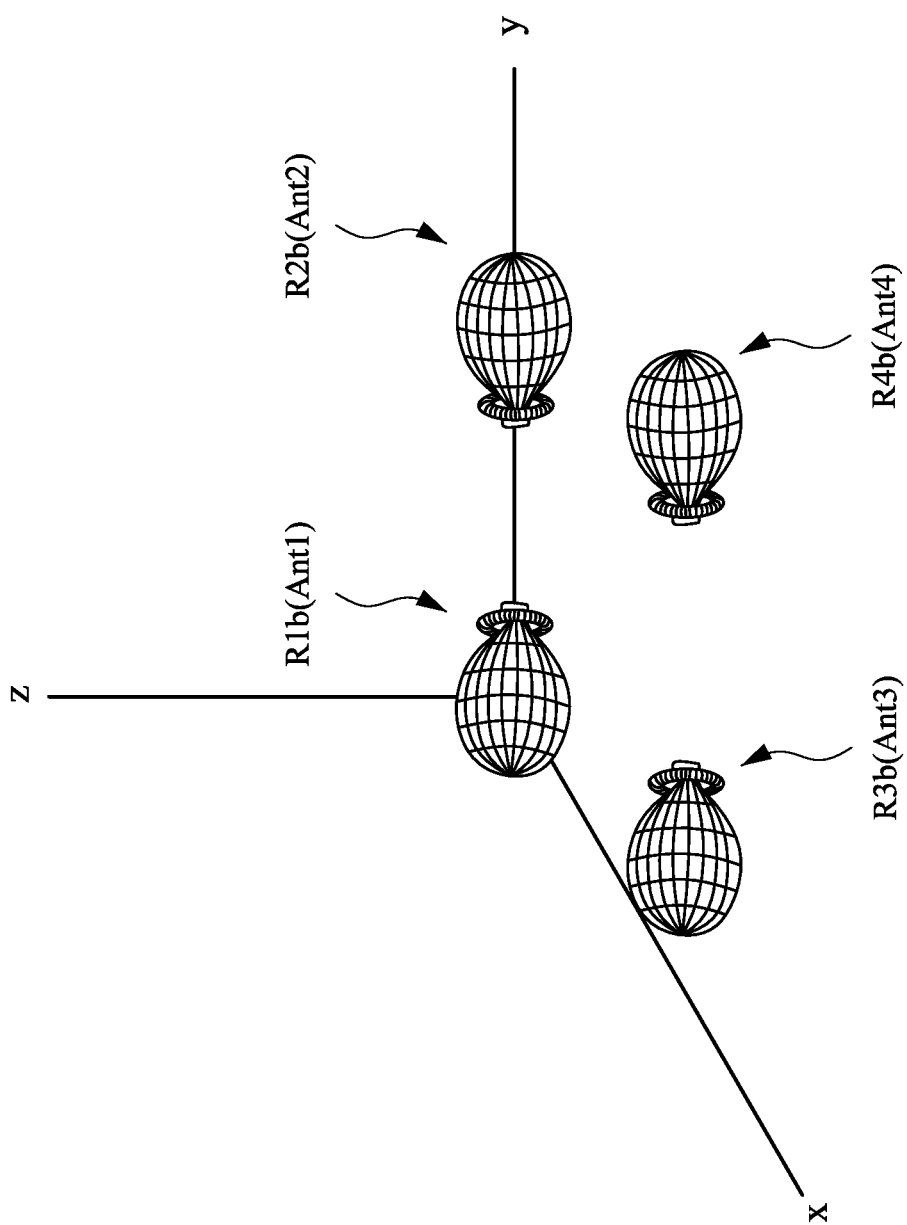
FIG. 7B is a stereo diagram of the initial radiation patterns, in accordance with the embodiment of FIG. 7A.
Figure 8A:
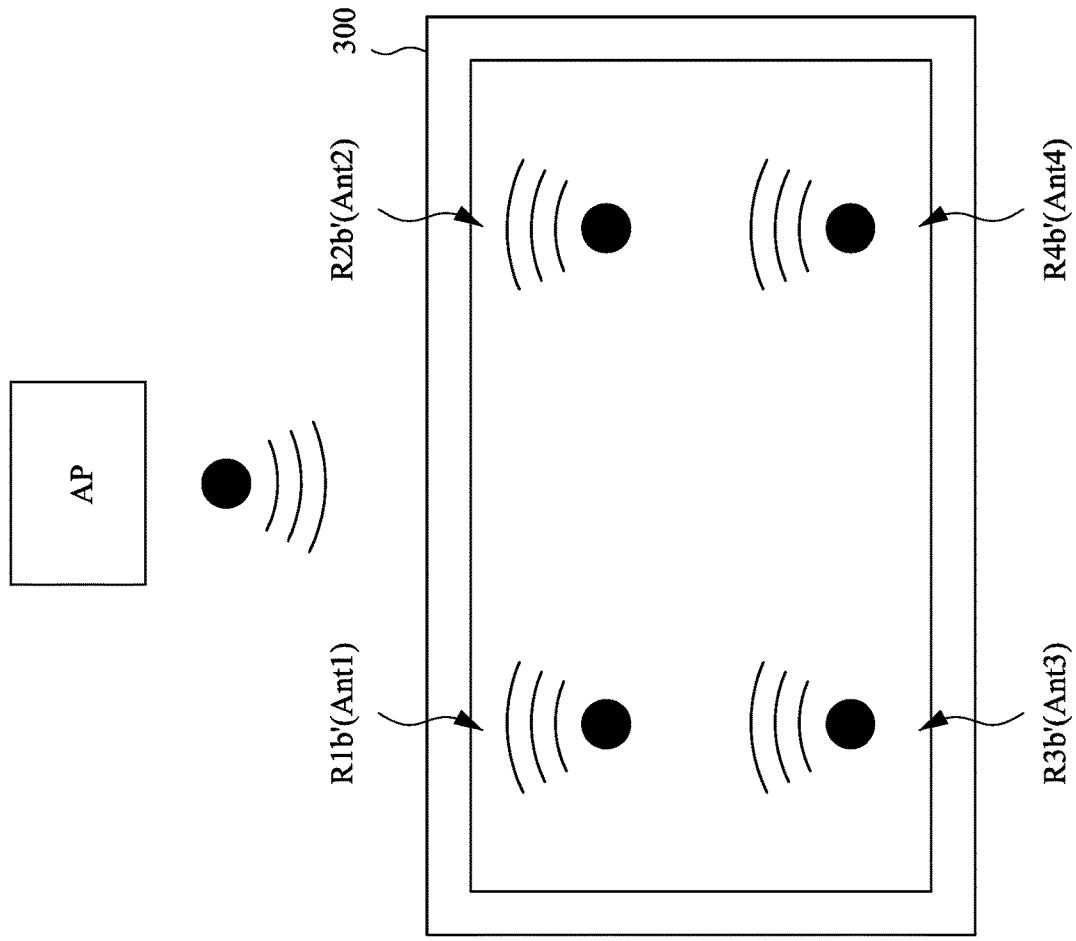
FIG. 8A is a top view diagram of switched radiation patterns of the smart antenna system, in accordance with another embodiment of the present disclosure.
Figure 8A:
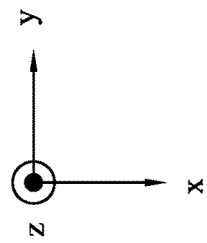
Figure 8B:
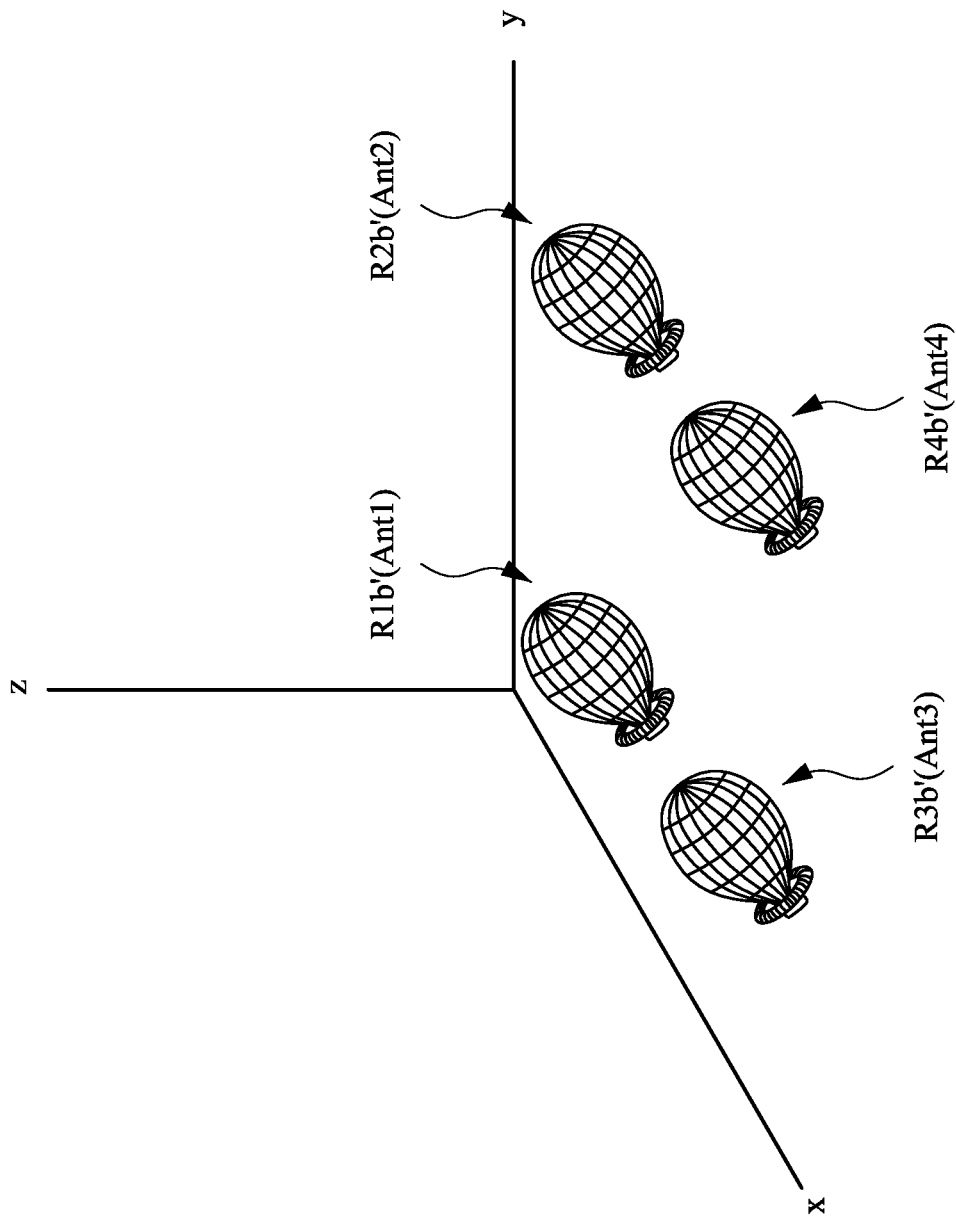
FIG. 8B is a stereo diagram of the switched radiation patterns, in accordance with the embodiment of FIG. 8A.

FIG. 7A is a top view diagram of initial radiation patterns of the smart antenna system 100, in accordance with another embodiment of the present disclosure. FIG. 7B is a stereo diagram of the initial radiation patterns, in accordance with the embodiment of FIG. 7A. FIG. 8A is a top view diagram of switched radiation patterns of the smart antenna system 100, in accordance with another embodiment of the present disclosure. FIG. 8B is a stereo diagram of the switched radiation patterns, in accordance with the embodiment of FIG. 8A.

As shown in FIGS. 7A-7B, the antennas Ant1-Ant4 have preset radiation patterns R1$b$-R4$b$. For the sake of brevity, those descriptions will not be repeated here. In the embodiment of FIGS. 7A-7B, the wireless access point AP is configured in a second direction (i.e., −x direction) of the mobile device 300. The wireless network controller 110 determines that the wireless signals received by the antennas Ant1-Ant4 are weak, since the radiation patterns R1$b$-R4$b$ of the antennas Ant1-Ant4 are not directed to the direction that the wireless access point AP is located at, and thus the wireless network controller 110 transmits the RSSIs I1-I4 that are smaller than the threshold value.

Therefore, in step S404, the processor 120 will switch each of the control signals CS1-CS4 from the preset numerical value to a proper value, in order to switch the radiation patterns R1$b$-R4$b$ of the antennas Ant1-Ant4 to radiation patterns R1$b$'-R4$b$' that are directed to the second direction (i.e., −x direction) as shown in FIGS. 8A-8B, such that the RSSIs I1-I4 are substantially the same and not lower than the threshold value.

Based on above, to achieve better communication, by operating the method 400 of controlling smart antenna, the processor 120 generates a number of control signals respectively corresponding to the antennas according to the RSSIs, and switches the radiation patterns of the antennas according to the control signals, such that the RSSIs of the wireless signals are substantially the same and not lower than a threshold value.

In the multiple embodiments mentioned above, the relative locations of the wireless access point AP and the mobile device 300 are not limited in the first direction and the second direction, and the number of the antennas Ant1-Ant4 and directions that the preset radiation patterns are directed to are also not limited to the present disclosure.

Furthermore, the number of the impedance circuits in the switching circuit 130 is also not limited to the present disclosure, and may be designed according to actual needs. For instance, the switching circuit 130 may include 8 impedance circuits, and each of the control signals CS1-CS4 may be a 3-bit signal. For another example, the switching circuit 130 may include 16 impedance circuits, and each of the control signals CS1-CS4 may be a 4-bit signal and so on.

While the disclosure has been described by way of example(s) and in terms of the preferred embodiment(s), it is to be understood that the disclosure is not limited thereto. Those skilled in the art may make various changes, substitutions, and alterations herein without departing from the spirit and scope of the present disclosure. In view of the foregoing, it is intended that the present invention cover modifications and variations of this invention provided they fall within the scope of the following claims.

What is claimed is:

1. A smart antenna controlling method, suitable for controlling a smart antenna system, wherein the smart antenna system comprises a plurality of antennas, a wireless network controller, and a processor, and the smart antenna controlling method comprises:

respectively receiving, by the plurality of antennas, a plurality of wireless signals transmitted by a wireless access point;

providing a plurality of received signal strength indications (RSSIs) respectively corresponding to the plurality of wireless signals received by the plurality of antennas to the processor;

generating, by the processor, a plurality of control signals corresponding to the plurality of antennas, respectively, according to the plurality of RSSIs; and switching radiation patterns of the plurality of antennas according to the plurality of control signals, respectively, such that the plurality of RSSIs of the plurality of wireless signals are substantially the same and not lower than a threshold value, wherein generating the plurality of control signals respectively corresponding to the plurality of antennas comprises:

generating a control signal having a preset value by the processor, if one of the plurality of RSSIs is smaller than the threshold value; and switching the control signal to another value different from the preset value by the processor, if the one of the plurality of RSSIs is larger than the threshold value, wherein the control signal having the another value is configured to switch a radiation pattern of a corresponding one of the plurality of antennas, and the control signal having the preset value is configured to keep a radiation pattern of the corresponding one of the plurality of antennas.

2. The smart antenna controlling method of claim 1, wherein rendering the plurality of RSSIs of the plurality of wireless signals substantially the same comprises:

switching radiation patterns of the plurality of antennas such that signal-to-noise rations of the plurality of wireless signals are substantially the same.

3. A smart antenna system comprising:

a plurality of antennas configured to receive a plurality of wireless signals transmitted by a wireless access point, respectively;

a wireless network controller configured to provide a plurality of received signal strength indications (RSSIs) respectively corresponding to the plurality of wireless signals according to the plurality of wireless signals received by the plurality of antennas;

a processor, electrically coupled to the wireless network controller and the plurality of antennas, configured to generate a plurality of control signals respectively corresponding to the plurality of antennas according to the plurality of RSSIs; and a plurality of switching circuits coupled to the processor, and respectively coupled to the plurality of antennas, configured to switch radiation patterns of the plurality of antennas according to the plurality of control signals, respectively, such that the plurality of RSSIs of the plurality of wireless signals are substantially the same and not lower than a threshold value, wherein the processor is further configured to execute operations below:

generating a control signal having a preset value, by the processor, if one of the plurality of RSSIs is smaller than the threshold value; and switching the control signal to another value different from the preset value, by the processor, if the one of the plurality of RSSIs is larger than the threshold value, wherein the control signal having the another value is configured to switch a radiation pattern of a corresponding one of the plurality of antennas, and the control signal having the preset value is configured to keep a radiation pattern of the corresponding one of the plurality of antennas.

4. The smart antenna system of claim 3, wherein each of the plurality of switching circuits comprises:

a switch coupled to a plurality of connection points, a coupling point of the corresponding one of the plurality of antennas and the processor, configured to selectively conduct the coupling point to one or more of the plurality of connection points according to the plurality of control signals; and a plurality of impedance circuits respectively coupled between the plurality of connection points and a ground.

5. The smart antenna system of claim 4, wherein the switch is a radio frequency switch or a phase controller.

6. The smart antenna system of claim 4, wherein the plurality of impedance circuits are resistors, inductors or capacitors.

7. The smart antenna system of claim 3, wherein each of the plurality of RSSIs is positively correlated to a signal-to-noise ratio of a corresponding one of the plurality of wireless signals.

8. The smart antenna system of claim 3, wherein the processor is a microcontroller, an application specification integrated circuit (ASIC), field programmable gate arrays (FPGA) or a central processing unit (CPU).

* * * * *